(12) United States Patent
Lilliestielke et al.

(10) Patent No.: US 7,481,036 B2
(45) Date of Patent: Jan. 27, 2009

(54) ACCESSIBLE LAWN MOWER DECK

(75) Inventors: Fredrik Lilliestielke, Jönköping (SE); Peter Mejegård, Jönköping (SE); Mats Axelsson, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 109 days.

(21) Appl. No.: 11/512,947

(22) Filed: Aug. 30, 2006

(65) Prior Publication Data
US 2007/0051083 A1 Mar. 8, 2007

(30) Foreign Application Priority Data
Sep. 2, 2005 (SE) .................................... 0501953

(51) Int. Cl.
*A01D 34/00* (2006.01)
(52) U.S. Cl. .................................... 56/15.9; 56/DIG. 22
(58) Field of Classification Search ................ 56/6, 56/12.6, 14.7, 14.9–15.3, 15.6–15.9, 16.3, 56/17.1, 320.1, DIG. 14, DIG. 22
See application file for complete search history.

(56) References Cited

U.S. PATENT DOCUMENTS

| 4,779,406 A | 10/1988 | Schroeder | |
|---|---|---|---|
| 5,079,907 A | 1/1992 | Sameshima et al. | |
| 5,459,984 A * | 10/1995 | Reichen et al. | 56/7 |
| 5,816,035 A * | 10/1998 | Schick | 56/15.2 |
| 5,927,055 A * | 7/1999 | Ferree et al. | 56/15.9 |
| 6,341,480 B1 * | 1/2002 | Dahl et al. | 56/15.9 |
| 6,347,503 B1 * | 2/2002 | Esau et al. | 56/15.9 |
| 6,516,597 B1 * | 2/2003 | Samejima et al. | 56/16.7 |
| 6,988,351 B2 * | 1/2006 | Schick et al. | 56/15.9 |
| 7,293,398 B2 * | 11/2007 | Koehn | 56/15.9 |

FOREIGN PATENT DOCUMENTS

JP   08256556   10/1996

OTHER PUBLICATIONS

European Search Report dated Jan. 17, 2007 for Application No. EP 06119913.

* cited by examiner

*Primary Examiner*—Thomas B Will
*Assistant Examiner*—Mai T Nguyen
(74) *Attorney, Agent, or Firm*—Pearne & Gordon LLP

(57) ABSTRACT

The present invention relates to a lawn mower (1), comprising a chassis (7), a front mounted mower deck (5), and at least one support arm (9) connecting the mower deck (5) with the chassis (7). The support arm (9) is movable with respect to the chassis (7) for lifting the mower deck (5) from a lower position to an upper position. In the upper position, the mower deck (5) is tiltable about a horizontal pivot axis (11) with respect to the support arm (9) without interfering with the ground. The lawn mower is characterised in that the centre of gravity (21) of the mower deck (5) is located in front of the pivot axis (11), with respect to the forward direction of the lawn mower (1), when the mower deck (5) is lifted to the upper position.

7 Claims, 2 Drawing Sheets

ACCESSIBLE LAWN MOWER DECK

FIELD OF THE INVENTION

The present invention relates to a lawn mower in accordance with the preamble of claim 1.

BACKGROUND OF THE INVENTION

Lawn mowers with front mounted mower decks regularly require service and maintenance, e.g. grass removing, cleaning and sharpening of the cutting knifes so as to function properly. When the lawn mower is positioned on the ground, the part of the mower deck to be serviced, i.e. the underside is normally inaccessible to an operator. A common solution to this problem is to make the mower deck tiltable so that an operator can get access to the underside.

RELATED ART

A related art lawn mower comprises a chassis, a front mounted mower deck and support arms connecting the mower deck with the chassis. The support arms are movable with respect to the chassis for lifting the mower deck from a lower position to an upper position, in which upper position the mower deck is tiltable about a horizontal pivot axis with respect to the support arms without interfering with the ground. In the upper position, the mower deck can tilt from a first position in which an underside of the mower deck is directed downwardly, to a second position in which the underside of the mower deck is accessible to an operator standing in front of the lawn mower. A locking mechanism is also provided for suspending and fastening a rear edge of the mower deck to the support arms.

To get access to the underside of the mower deck, the operator first need to lift the support arms together with the mower deck (usually accomplished in a hydraulic way) a predetermined distance from the ground. The distance is chosen so that it exceeds the distance between the pivot axis and the rear edge of the mower deck. In the elevated position, the mower deck is no longer supported by the ground, but the whole weight of the mower deck is supported by the support arms, i.e. along the pivot axis and by the locking mechanism. Now, the operator needs to unlock the locking mechanism so that the mower deck is only supported along the pivot axis. When this is done, the operator need to put himself in front of the mower deck and manually lift the mower deck so it tilts about the pivot axis. Since the distance between the pivot axis and the rear edge of the mower deck is less than the elevated distance, the mower deck can tilt about the pivot axis without colliding with the ground. When the mower deck has reached an erected position in which the operator can get access to the underside of the mower deck, the operator can lock the mower deck in that position by any suitable means.

However, a disadvantage with this mower deck is that the operator needs to hold the rear edge of the mower deck with one hand while the other hand unlocks the locking mechanism. The purpose is to reduce the load on the locking mechanism while it is unlocked and to prevent the mower deck from falling down. This puts the operator in an operating position which is disadvantageous from an ergonomic point of view.

OBJECT OF THE INVENTION

An object of the present invention is to provide a lawn mower comprising a front mounted mower deck which, from an ergonomic point of view, is easier to put in a service and maintenance position.

SUMMARY OF THE INVENTION

This object is achieved with a lawn mower as initially described and with features according to the characterising portion of claim 1.

Since the centre of gravity of the mower deck is located in front of the pivot axis, with respect to the forward direction of the lawn mower, an important advantage is achieved. What is happening is that the mower deck will perform a pivotal motion so it approaches the support arms from below when the mower deck is lifted to the upper position. This pivotal motion is obtained automatically under the influence of the weight of the mower deck, due to the centre of gravity location with respect to the pivot axis, and continues until the mower deck abuts against the underside of the support arms. Thus, the operator does not need to hold the rear edge of the mower deck with one hand to prevent the mower deck from falling down.

Preferably, the lawn mower comprises a locking mechanism for locking a rear edge of the mower deck to the support arm, at a point which is located behind the pivot axis, with respect to the forward direction of the lawn mower. Hereby, the locking mechanism will not be subjected to the weight of the lawn mower when the mower deck is put in the upper position. Thus, unlocking is simplified.

Suitably, the lawn mower comprises a second locking mechanism for locking the mower deck to the chassis when the mower deck is put in the second position. Hereby, the mower deck can be held firmly to the chassis.

Preferably, the centre of gravity of the mower deck is located just in front of the pivot axis with respect to the forward direction of the lawn mower. Hereby, the risk that the lawn mower becomes unbalanced and tip forward is minimized.

Suitably, the underside of the mower deck is directed substantially forwardly when the mower deck is in the second position. Hereby, the underside is readily accessible to the operator.

Preferably, the plane of the mower deck has passed the vertical line when the mower deck is in the second position. Hereby, the risk that the mower deck falls back to its original position is reduced.

BRIEF DESCRIPTION OF THE DRAWINGS

The present invention will now be described with reference to accompanying drawings, on which.

DETAILED DESCRIPTION OF A PREFERRED EMBODIMENT

Figure 1:
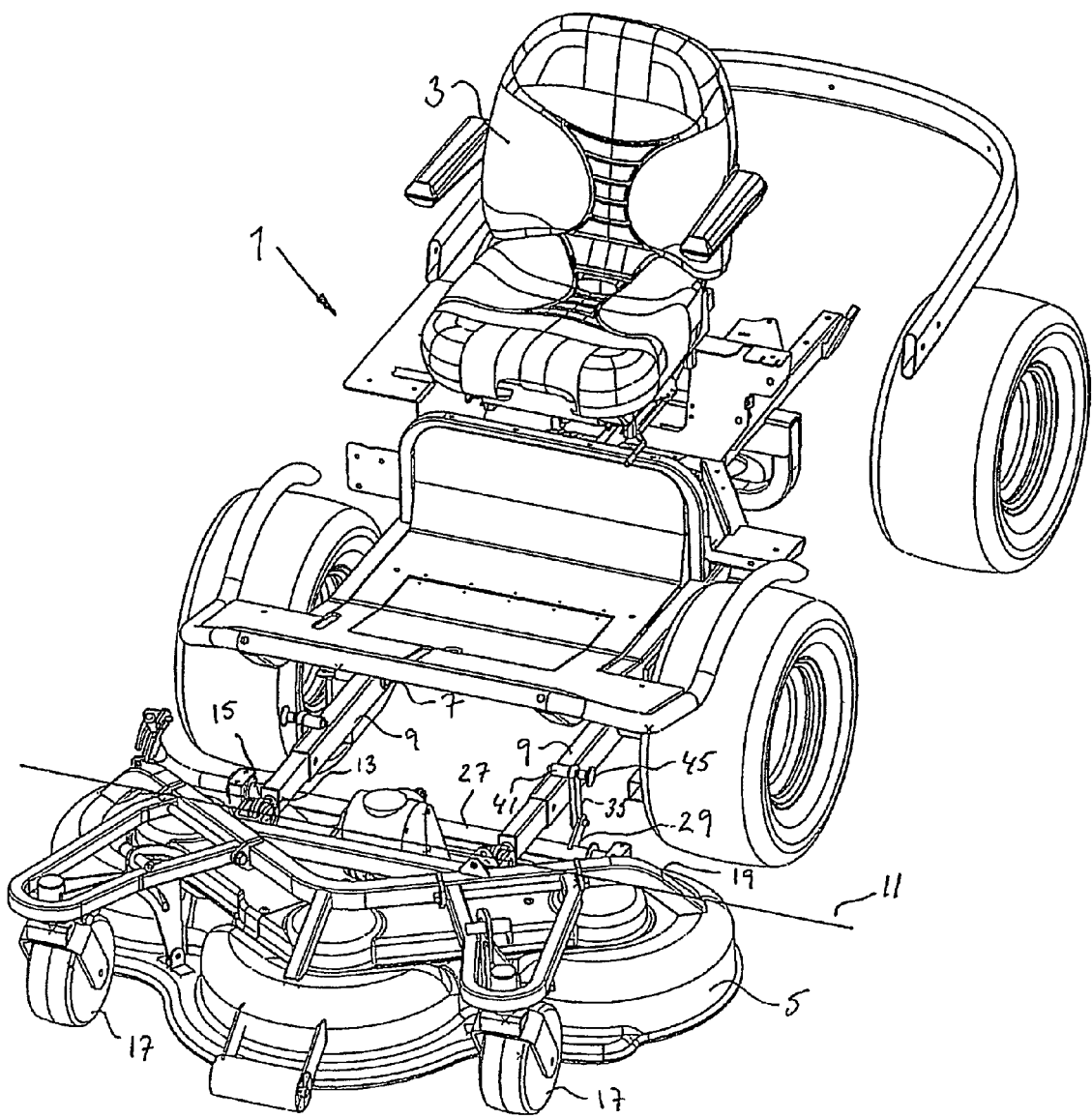
FIG. 1 is a perspective view of a lawn mower having a front mounted mower deck.

FIG. 1 shows a lawn mower 1 according to the present invention. The lawn mower comprises a seat 3 for an operator to sit on when manoeuvring the lawnmower 1. Steering wheel, brake pedal, throttle pedal as well as other handles, knobs and pedals suitable for its operation have been omitted for the sake of clarity. The lawn mower 1 further comprises a front mounted mower deck 5 which is connected to the chassis 7 of the lawn mower by means of first and second support arms 9. The term mower deck 5 is intended to mean the whole unit which is connected to the support arms in front of the lawn mower, i.e. including the whole casing with pivot wheels, cutting knifes, cutting height adjusting equipment and so on.

The support arms 9 are vertically adjustable by means of a not shown hydraulic cylinder. This means that the mower deck 5 can be lifted from a lower cutting position to an upper transport position. The mower deck 5 can also be tilted about a horizontal pivot axis 11 with respect to the support arms 9, so that the mower deck 5 can take a position in which the underside of the mower deck 5 becomes easily accessible to an operator in case of service and maintenance. The distal end 13 of each support arm 9 is provided with a joint 15 for connection to the mower deck 5. The pivot axis 11 thus extends between the joints 15, i.e. perpendicularly to the longitudinal direction of the support arms 9.

Figure 2:
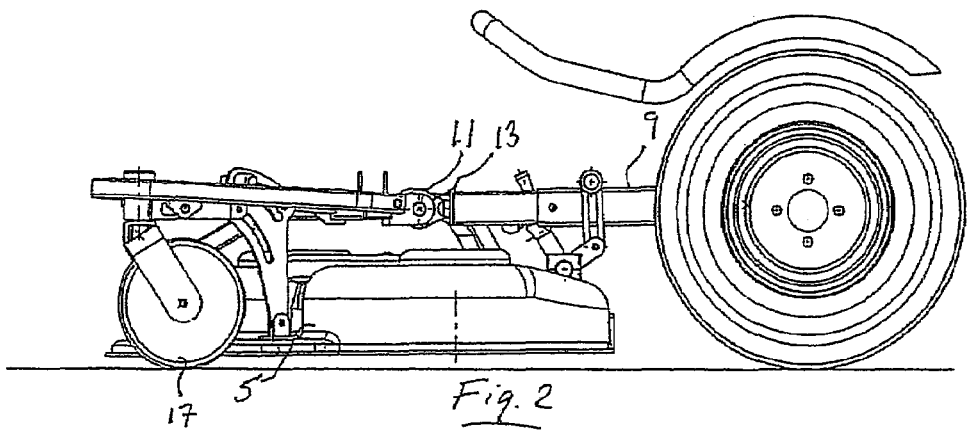
FIG. 2 is a side view of the mower deck in a lower position.

FIG. 2 shows a side view of the mower deck 5 in a position in which it is ready for cutting or mowing grass, which means that the mower deck 5 rests on the ground by means of two pivot wheels 17 mounted at the front edge of the mower deck 5. In this position, the mower deck 5 is positioned substantially horizontally so as to perform a uniform cutting.

Figure 3:
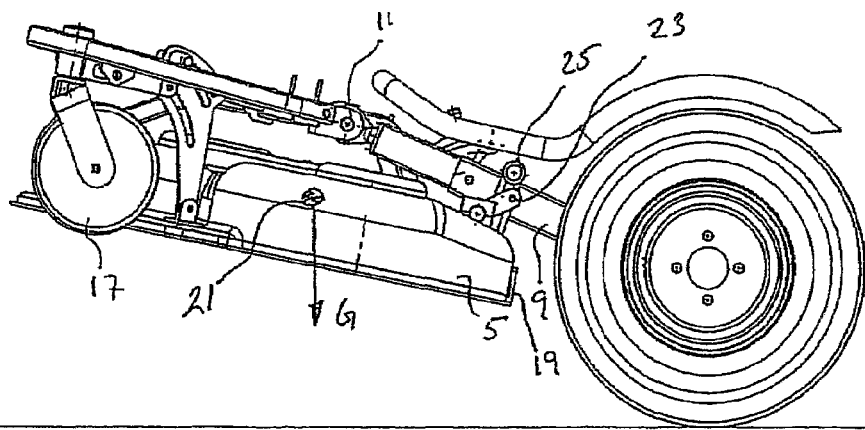
FIG. 3 is a side view of the mower deck in an upper position.

As shown in FIG. 3, the support arms 9 have been lifted to an upper position by means of the not shown hydraulic cylinder. The hydraulic cylinder pivots the support arms 9 in a clockwise motion (as seen in FIG. 3) with a predetermined angle. In this upper position, the front pivot wheels 17 no longer rest on the ground, so the whole weight of the mower deck 5 is supported by the support arms 9. This upper position is required during the transportation of the lawn mower 1, e.g. to and from the lawn to be cut. This upper position is also required when the operator needs access to the underside of the mower deck 5, where the knifes are situated, e.g. to perform service or other maintenance work. The height by which the mower deck 5 is lifted from the ground, i.e. from the lower position to the upper position, must be greater than the distance between the pivot axis 11 of the mower deck 5 and a rear edge 19 of the mower deck 5. If not, the mower deck will collide or interfere with the ground during the tilting motion of the mower deck 5.

As also seen in FIG. 3, the mower deck 5 has been designed so that its centre of gravity 21 is located in front of the pivot axis 11 (i.e. on the left side of the pivot axis as seen in FIG. 3). Due to this position of the centre of gravity 21 and since the mower deck is positioned in the upper position, with no contact with the ground (i.e. fully suspended by the support arms), the mower deck 5 will try to reach equilibrium and therefore pivot in the anti-clockwise direction (as seen in FIG. 3) until the top rear edge of the mower deck 5 abuts against the underside of the support arms, which then prevent further pivotal. This is an automatic behaviour with no human intervention and is realized due to the weight distribution of the mower deck 5 with respect to the pivot axis 11.

At the top rear edge of the mower deck 5, a suspension arrangement 23 is provided and a locking mechanism 25 is provided on the support arms. The suspension arrangement 23 and the locking mechanism 25 cooperate so as to fasten the mower deck 5 to the support arms 9.

The suspension arrangement 23 comprises a cross-bar 27 (see FIG. 1) having a circular cross-section and which is mounted to and along the rear edge 19 of the mower deck 5. Two brackets 29 are attached to the cross-bar 27 in the vicinity of each support arm 9 and projects perpendicularly from it. A first end of the bracket 29 is attached to the cross-bar 27, while an oblong chain link 35 is attached to the opposite end by means of a bolt-nut or rivet joint in such a way that the chain link 35 can slide along the bolt/rivet.

Each locking mechanism 25 comprises a hollow sleeve 41 which is fixedly mounted on top of the support arm 9 in such a way that a through hole of the sleeve 41 extends perpendicularly to the longitudinal direction of the support arm 9. Each locking mechanism 25 further comprises a detachable pin 45 which can fit into the sleeve 41.

The rear edge 19 of the mower deck 5 can thus be suspended by the support arm 9 by means of the pin 45 when it is led through the chain link 35 and through the sleeve 41 on the support arm 9. The reverse action is of course also conceivable, i.e. the rear edge 19 of mower deck 5 can be disengaged from the locking mechanism 25 by simply removing the pin 45 from the sleeve 41.

The advantage with this location of the centre of gravity 21 of the mower deck 5 is that the locking mechanism 25 is not loaded by the weight of the mower deck 5. Thus, it is made easier to disengage the locking mechanism 25, i.e. to remove the pin 45 from the sleeve 41 when the mower deck 5 is in the upper position. When removing the pin 45, the mower deck 5 will not fall down against the ground as will happen with related art mower decks, so the operator does not need to hold the mower deck 5 with one hand while removing the pin 45.

Figure 4:
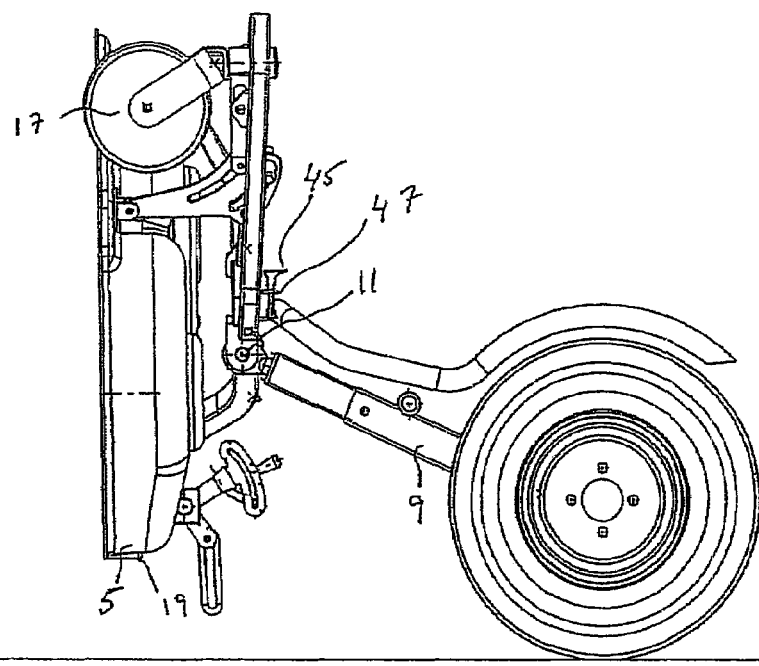
FIG. 4 is a side view of the mower deck in a tilted position ready for service and maintenance.

FIG. 4 shows the mower deck 5 when it has been tilted to a service and maintenance position. To tilt the mower deck 5, the operator need to put himself in front of the mower deck 5 (i.e. after the mower deck 5 has been put in the upper position and after the pins 45 have been removed) and by hand power lift the mower deck 5 so it rotates about the pivot axis 11. When the mower deck 5 has reached the service and maintenance position, e.g. a substantially vertical position or/and when the plane of the mower deck 5 has passed beyond the vertical line, the mower deck 5 can be locked in this position by means of a second locking mechanism 47 of similar type as the first locking mechanism 25.

It is also conceivable to put the mower deck 5 in a different service and maintenance position, e.g. a position where the underside of the mower deck is directed upwards, or in any other position in which an operator will have access to the underside of the mower deck 5 with tools and/or cleaning equipment.

The invention claimed is:

1. A lawn mower (1), comprising:
   a chassis (7),
   a front mounted mower deck (5) having an underside that can be directed downwardly toward the ground for mowing,
   at least one supported arm (9) connecting the mower deck (5) with the chassis (7),
   wherein the support arm (9) is movable with respect to the chassis (7) for lifting the mower deck (5) from a lower position to an upper position, in which upper position the mower deck (5) is tiltable about a horizontal pivot axis (11) with respect to the support arm (9) without interfering with the ground, from a first position in which the underside of the mower deck (5) is directed downwardly, to a second position in which the underside of the mower deck (5) is directed substantially forwardly and is accessible to an operator standing in front of the lawn mower (1), characterised in that
   the mower deck (5) has its centre of gravity (21) located in front of the pivot axis (11) when the mower deck (5) is in the upper position and in the first position and in the second position, with respect to the forward direction of the lawn mower (1).

2. Lawn mower according to claim 1, further comprising a locking mechanism (25) for locking a rear edge (19) of the mower deck (5) to the support arm (9), at a point which is located behind the pivot axis (11) with respect to the forward direction of the lawn mower (1).

3. Lawn mower according to claim 1 or 2, further comprising a second locking mechanism (47) for locking the mower deck (5) to the chassis (7) when the mower deck (5) is put in the second position.

4. Lawn mower according to claim 1, wherein the mower deck (5) extends to have a plane in which grass is cut grass when the underside of the deck (5) is directed downwardly toward the ground for mowing, the extending plane of the mower deck (5) is located forward of a vertical line intersecting the pivot axis (11) when the mower deck (5) is in the second position.

5. A lawn mower (1), comprising:
   a chassis (7),
   a front mounted mower deck (5),
   at least one supported arm (9) wherein a distal end (13) of each arm is provided with a joint (15) that is configured to connect the mower deck (5) with the chassis (7) at a first location;
   a horizontal pivot axis (11) extending between each joint (15) with respect to the support arm (9);
   a suspension arrangement (23) mounted on a top rear edge of the mower deck (5);
   a locking mechanism (25) mounted on the support arms (9);
   wherein the suspension arrangement (23) and the locking mechanism (25) engage each other so as to removably fasten the mower deck (5) to the support arms (9) at a second location;
   wherein the support arm (9) is movable with respect to the chassis (7) for lifting the mower deck (5) from a lower position to an upper position, in which upper position the mower deck (5) is tiltable about the horizontal pivot axis (11) without interfering with the ground upon the suspension arrangement (23) and the locking mechanism (25) being disengaged;
   wherein the mower deck (5) is tiltable from a first position in which an underside of the mower deck (5) is directed downwardly to a second position in which the underside of the mower deck (5) is accessible to an operator standing in front of the lawn mower (1); and
   the mower deck (5) has its centre of gravity (21) located in front of the pivot axis (11) when the mower deck (5) is in the upper position and in the first position and in the second position, with respect to the forward direction of the lawn mower (1).

6. Lawn mower according to claim 5, wherein the suspension arrangement (23) comprises:
   a cross-bar (27) which is mounted to and along a rear edge (19) of the mower deck (5);
   two brackets (29) attached to the cross-bar (27);
   wherein a first end of each bracket (29) is attached to the cross-bar (27);
   wherein a chain link (35) is attached to a second end of each bracket (29) by a joint such that the chain link (35) can slide along the joint;
   wherein the locking mechanism (25) comprises:
   a sleeve (41) which is fixedly mounted on top of the support arm (9);
   a detachable pin (45) which can fit into the sleeve (41);
   wherein the suspension arrangement (23) engages the locking mechanism (25) by the pin (45) being led through the chain link (35) and through the sleeve (41) on the support arm (9).

7. Lawn mower according to claim 5, further comprising a second locking mechanism (47) for locking the mower deck (5) to the chassis (7) when the mower deck (5) is put in the second position.

* * * * *